(12) United States Patent
Poskie et al.

(10) Patent No.: US 8,025,081 B2
(45) Date of Patent: Sep. 27, 2011

(54) FLUID TRANSFER INSERT

(75) Inventors: Fredrick R. Poskie, Plymouth, MI (US); Scott H. Wittkopp, Ypsilanti, MI (US); Elizabeth I. Wooden, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 991 days.

(21) Appl. No.: 11/937,938

(22) Filed: Nov. 9, 2007

(65) Prior Publication Data

US 2009/0123318 A1    May 14, 2009

(51) Int. Cl.
*F16L 11/00* (2006.01)

(52) U.S. Cl. .................. 138/114; 138/42; 418/102

(58) Field of Classification Search ............. 138/114, 138/42; 418/102, 113
See application file for complete search history.

(56) References Cited

U.S. PATENT DOCUMENTS

| | | | | |
|---|---|---|---|---|
| 6,039,066 A | * | 3/2000 | Selby | 137/312 |
| D454,942 S | * | 3/2002 | Selby | D23/266 |
| 6,648,007 B1 | * | 11/2003 | Selby et al. | 137/312 |

* cited by examiner

*Primary Examiner* — Patrick F Brinson

(57) ABSTRACT

A shaft assembly includes a fluid transfer insert located within a bore of a shaft. The fluid transfer insert seals to the shaft and includes at least one fluid channel that communicates between a plurality of fluid ports located in the shaft. The fluid channel is defined by an outer surface of the fluid transfer insert.

15 Claims, 3 Drawing Sheets

FLUID TRANSFER INSERT

FIELD

Figure 1A:
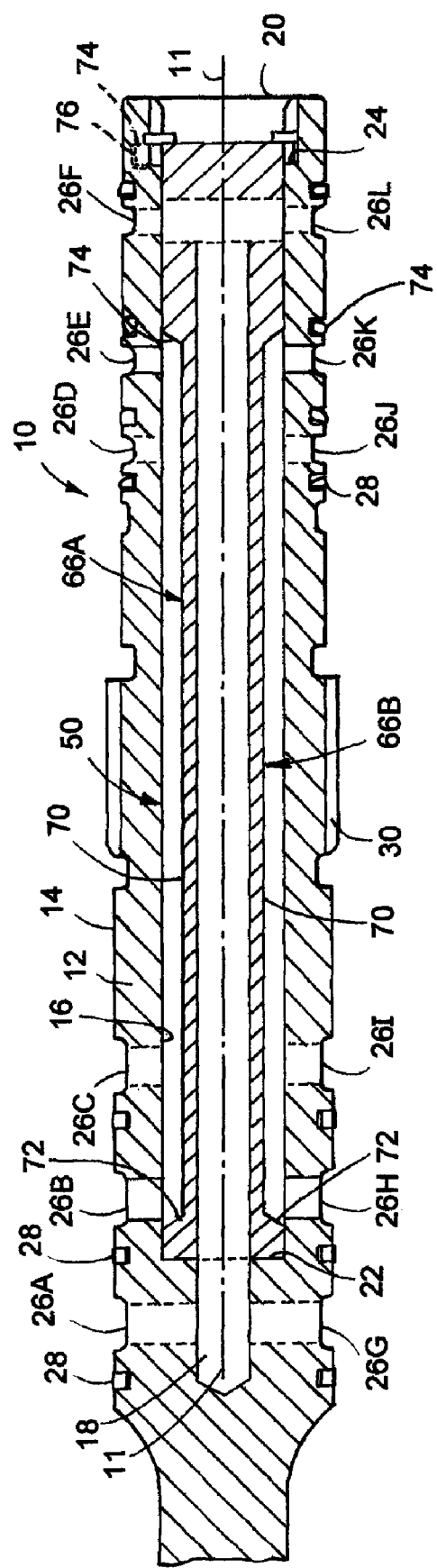

The present disclosure relates to a device for transferring fluid, and more particularly to a fluid transfer insert for a component in a transmission.

BACKGROUND

The statements in this section merely provide background information related to the present disclosure and may or may not constitute prior art.

Automatic transmissions typically include a hydraulic circuit or system that uses a hydraulic fluid, such as oil, for various purposes throughout the transmission. For example, the hydraulic system may direct oil to various transmission components to act as lubrication between moving components, to act as a cooling system for dissipating waste heat, and to act as a hydraulic control system for actuating various devices.

In many applications it may be desirable to transmit fluid along the length of a shaft, such as a turbine shaft or input/output shaft. However, these shafts are preferably hollow to reduce weight and cost since most of the strength of the shaft is provided by the outer diameter of the shaft, thereby making interior material unnecessary. Various methods have been employed to transmit fluid along the length of a shaft, such as non-concentric bore holes and multiple sleeves. While useful for their intended purpose, there is a need for a device to transmit hydraulic fluid through a shaft that reduces weight, cost, and packaging size while remaining simple and effective.

SUMMARY

The present invention provides a shaft assembly that includes a fluid transfer insert located within a bore of a shaft. The fluid transfer insert seals to the shaft and includes at least one fluid channel that communicates between a plurality of fluid ports in the shaft. The fluid channel is defined by an outer surface of the fluid transfer insert.

An embodiment of the shaft assembly includes a shaft having an inner surface that defines a bore, the bore defining an axis, wherein the shaft has a first fluid port that communicates a fluid to the bore and a second fluid port that communicates the fluid from the bore, wherein the first fluid port is located a distance along the axis from the second fluid port. A fluid transfer insert is located within the bore and coaxial with the axis, the fluid transfer insert having an outer surface sealingly engaged with the inner surface of the shaft, the outer surface defining a fluid channel having a length at least greater than the distance between the first fluid port and the second fluid port, the fluid channel parallel to the axis and in communication with the first fluid port and the second fluid port. The fluid communicates from the first fluid port through the fluid channel to the second fluid port.

In one aspect of the present invention, the outer surface of the fluid transfer insert includes a first end wall, a second end wall, and a pair of side walls that extend into the fluid transfer insert to define the fluid channel.

In another aspect of the present invention, the fluid channel has a bottom surface defined by the outer surface of the fluid transfer insert and a top surface defined by the inner surface of the shaft.

In yet another aspect of the present invention, each of the pair of side walls are at a right angle with respect to the bottom surface.

In yet another aspect of the present invention, the shaft includes eight fluid ports and wherein the fluid transfer insert includes four fluid channels, and wherein each of the fluid channels is in fluid communication with at least two of the plurality of fluid ports such that fluid communicates from four of the eight fluid ports through the four fluid channels to another four of the eight fluid ports.

In yet another aspect of the present invention, a first and second of the four fluid channels have a length greater than a length of a third and fourth of the four fluid channels.

In yet another aspect of the present invention, the four fluid channels are spaced equally circumferentially apart on the outer surface of the fluid transfer insert.

In yet another aspect of the present invention, the fluid transfer insert includes a radial flange that abuts a stepped portion located in the bore of the shaft.

In yet another aspect of the present invention, the fluid transfer insert includes a protuberance that engages an aperture located in the bore of the shaft in order to prevent the fluid transfer insert from rotating relative to the shaft.

In yet another aspect of the present invention, a snap ring engages the inner surface of the bore and is positioned near an end of the fluid transfer insert in order to secure the fluid transfer insert in the bore.

In yet another aspect of the present invention, the shaft includes a third fluid port for communicating a fluid to the bore and a fourth fluid port for receiving the fluid from the bore, wherein the fluid transfer insert includes an inner surface that defines a central passage coaxial with the axis of the bore, an opening in an end of the fluid transfer insert that communicates with the central passage, and a fluid port located on the outer surface of the fluid transfer insert that communicates with the central passage, and wherein the fluid communicates from the third fluid port, through the bore, through the opening in the fluid transfer insert, through the central passage, through the fluid port in the fluid transfer insert, and to the fourth fluid port in the shaft.

Another embodiment of the present invention includes a fluid transfer insert for communicating fluid between a plurality of fluid ports in a shaft assembly. The fluid transfer insert includes a cylindrical outer surface sealingly engaged with the shaft assembly, the outer surface having a plurality of fluid channels each defined by a bottom surface, a pair of end walls that extend into the fluid transfer insert, and a pair of side walls that extend into the fluid transfer insert, wherein each of the fluid channels is in fluid communication with at least a pair of fluid ports in the shaft assembly. An inner surface defines a central passage coaxial with the shaft and defines a fluid port that communicates with the central passage and with a fluid port in the shaft assembly. A first end defines an opening that communicates with the central passage and at least one of the fluid ports in the shaft assembly. A second end includes a radial flange for abutting the shaft assembly. A protuberance extends out from the radial flange for engaging the shaft assembly in order to prevent the fluid transfer insert from rotating relative to the shaft assembly. A fluid flow communicates from one of the fluid ports in the shaft assembly, through one of the fluid channels and central passage, to another of the fluid ports in the shaft assembly.

In one aspect of the present invention, each of the pair of side walls is at a right angle with respect to the bottom surfaces.

In another aspect of the present invention, the four fluid channels are spaced equally circumferentially apart on the outer surface of the fluid transfer insert.

In yet another aspect of the present invention, a first and second of the four fluid channels have a length greater than a length of a third and fourth of the four fluid channels.

In yet another aspect of the present invention, a length of each of the four fluid channels is defined by a distance between the pair of ports that communicate with each of the fluid channels.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1B:
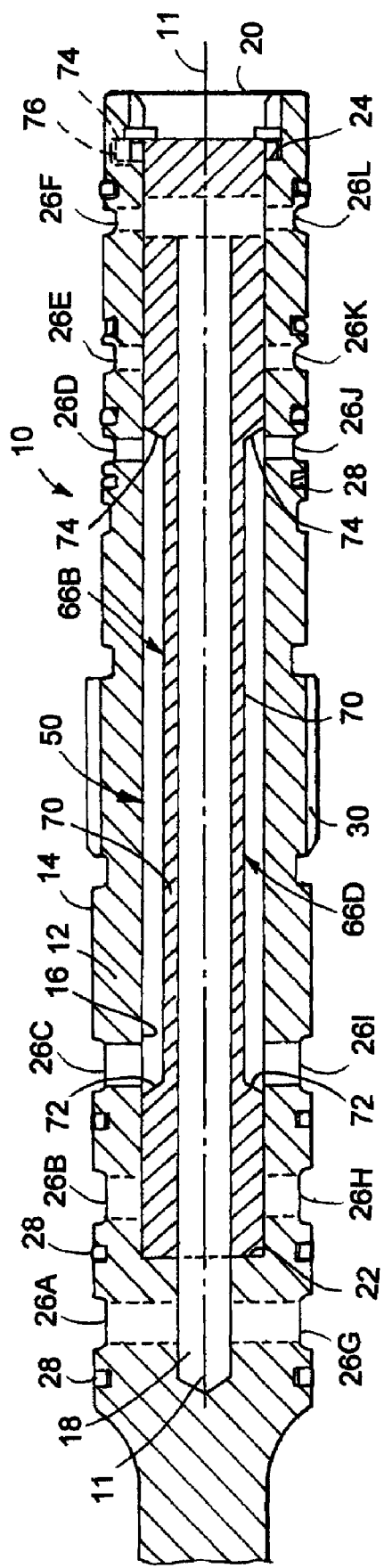
Figure 2:
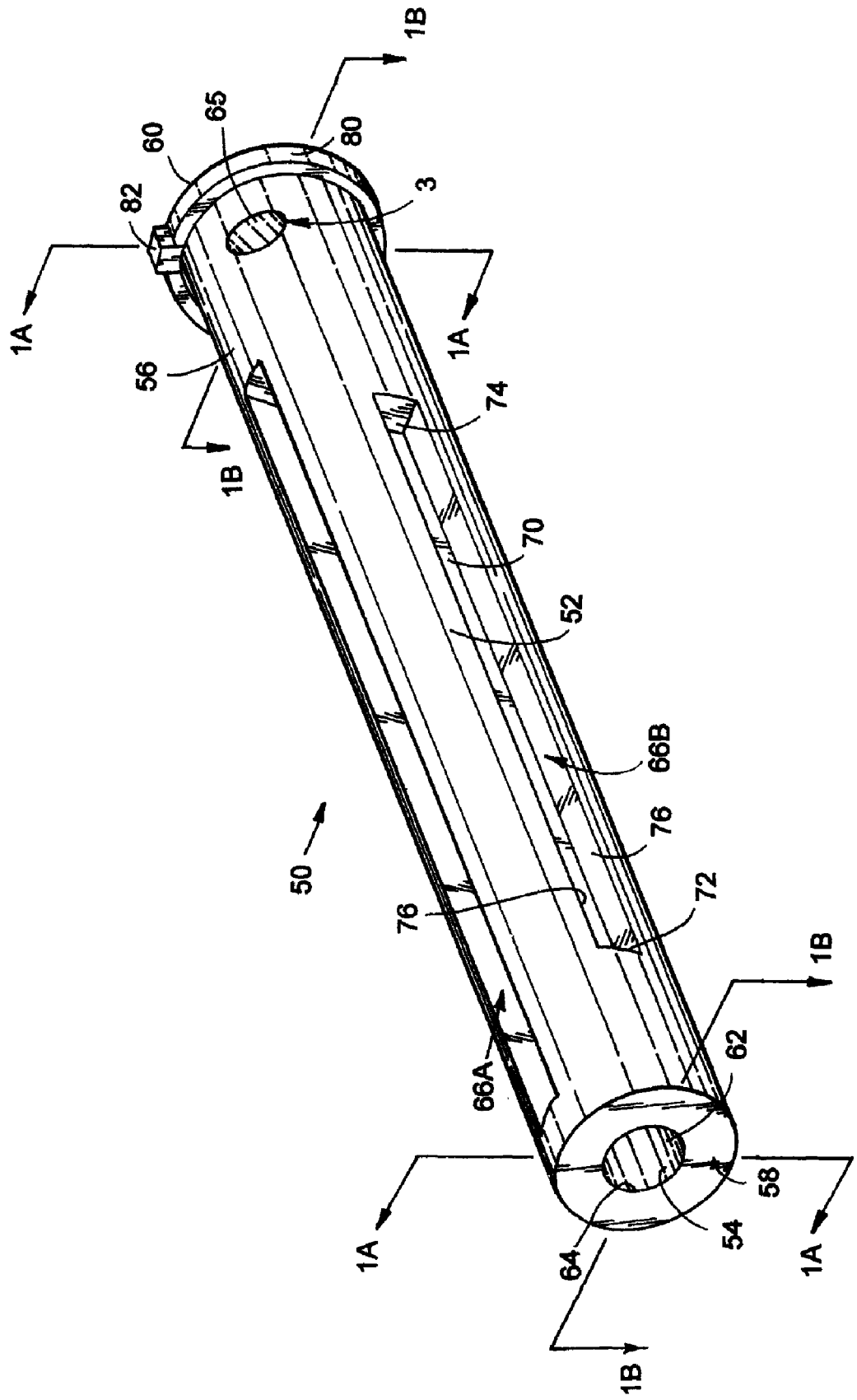

FIGS. 1A and 1B are cross-sectional views of an exemplary shaft assembly having an embodiment of a fluid transfer insert according to the principles of the present invention; and FIG. 2 is front perspective view of an embodiment of a fluid transfer insert according to the present invention.

DETAILED DESCRIPTION

The following description is merely exemplary in nature and is not intended to limit the present disclosure, application, or uses.

With reference to FIGS. 1A and 1B, an exemplary shaft assembly is illustrated and indicated by reference number 10. In the example provided, the shaft assembly 10 is a turbine shaft used in a transmission, however it should be appreciated that various other shafts may be employed without departing from the scope of the present invention. The shaft assembly 10 defines a linear axis 11 and includes a generally cylindrical shaft portion 12 having an outer surface 14 and an inner surface 16. The inner surface 16 defines a bore 18 that is coaxial to the axis 11. The bore 18 communicates with an opening 20 located in a terminal end of the shaft portion 12. The bore 18 includes a first stepped portion 22 proximate an end of the bore 18 opposite the opening 20 and a second stepped portion 24 proximate to the opening 20. The outer surface 14 includes a plurality of fluid ports, indicated by reference numbers 26A-26L, that communicate between the outer surface 14 of the shaft assembly 10 and the bore 18. The fluid ports 26A-L are preferably spaced along a length of the shaft portion 12, though the locations of the fluid ports 26A-L on the outer surface 14 may vary without departing from the scope of the present invention. Additionally, the number of fluid ports 26A-L may vary without departing from the scope of the present invention. The fluid ports 26A-L are operable to receive one or more fluid flows of a pressurized hydraulic fluid, such as oil. A plurality of radial seals 28 are sealingly engaged to the outer surface 14 and to a sleeve (not shown) or other structure that supports the shaft assembly 10. The radial seals 28 are located surrounding each of the fluid ports 20A-L to hydraulically isolate each of the fluid ports 20A-L. The outer surface 14 may include various other features, such as gear teeth 30 for engaging a gear (not shown), without departing from the scope of the present invention.

With reference to FIG. 2 and continued reference to FIGS. 1A and 1B, a fluid transfer insert, generally indicated by reference number 50, is employed to transfer the hydraulic fluid flows between the fluid ports 26A-L. The fluid transfer insert 50 includes a generally cylindrical body portion 52 having an inner surface 54, an outer surface 56, a first end 58, and a second end 60. The inner surface 54 defines a central passage 62 that is coaxial with the body portion 52. The central passage 62 communicates with an opening 64 located in the first end 58 and with a pair of fluid ports 65 located in the outer surface 56 proximate the second end 60.

The outer surface 56 defines a plurality of fluid channels 66A-D that extend parallel to the axis of the body portion 52. In the particular example provided, the fluid transfer insert 50 includes four fluid channels 66A-D sized and spaced to communicate with the exemplary number and location of the fluid ports 26A-L in the shaft assembly 10, though any number of fluid channels 66 may be included without departing from the scope of the present invention. The fluid channels 66A-D are each defined by a bottom surface 70, a first end wall 72, a second end wall 74, and a pair of side walls 76. Additionally, the fluid channels 66A-D have a top surface defined by the inner surface 16 of the shaft 12. In the example provided, each of the side walls 76 are at a right angle to the bottom 70. The fluid channels 66A-D extend into the body portion 52 to a predefined depth and width and have a predefined length. Accordingly, each of the fluid channels 66A-D may have different depths and widths to accommodate various amounts of fluid flow and different lengths to accommodate the locations of the various fluid ports 26A-L, as will be described in further detail below. For example, fluid channels 66A and 66C have a length greater than a length of fluid channels 66B and 66D. Additionally, the fluid channels 66A-D are spaced equally circumferentially apart along the outer surface 56 in the example provided.

The fluid transfer insert 50 also includes a radial flange 80 that extends radially along the edge of the second end 60. A key or protuberance 82 extends out from the radial flange 80. The key 82 is used to orient the fluid transfer insert 50 relative to the shaft assembly 10, as will be described in further detail below.

The fluid transfer insert 50 is sized to be press fitted within the bore 18 of the shaft assembly 10. More specifically, the fluid transfer insert 50 is inserted within the bore 18 such that the first end 58 of the fluid transfer insert 50 abuts the first stepped portion 22 and the radial flange 80 abuts the second stepped portion 24. The outer surface 56 of the fluid transfer insert 50 sealingly engages the inner surface 16 of the shaft assembly 10. The key 82 fits within an aperture 84 formed in the shaft portion 12 of the shaft assembly 10 in order to radially align the fluid transfer insert 50 with respect to the shaft assembly 10. The fluid transfer insert 50 is preferably held in place by a snap ring 86, though various other methods of securing the fluid transfer insert 50 within the shaft assembly 10 may be employed without departing from the scope of the present invention.

In the particular example provided, the fluid transfer insert 50 is aligned or oriented with the shaft portion 12 such that fluid channel 66A is aligned and communicates with fluid ports 26B and 26E, fluid channel 66C is aligned and communicates with fluid ports 26H and 26K, fluid channel 66B is aligned and communicates with fluid ports 26C and 26D, and fluid channel 66D is aligned and communicates with fluid ports 26I and 26J. Additionally, fluid ports 65 align with fluid ports 26F and 26L. Accordingly, fluid flow entering one of the fluid ports 26B, 26C, 26H, 26I passes into a fluid channel 66A-D in communication with the fluid ports 26B, 26C, 26H, 26I and is communicated along the length of the fluid transfer insert 50 to exit at one of the fluid ports 26D, 26E, 26J, and 26K. Therefore, the length of any given fluid channel 66A-D is at least equal to the distance between any two fluid ports 26B-E, 26H-K that communicate with the given fluid channel 66A-D. Additionally, fluid flow received by the fluid ports 26A and 26G may enter the bore 18 and pass through the opening 64 and into the central passage 62 of the fluid transfer insert 50. The fluid flow may then communicate through the fluid ports 65 and into the fluid ports 26F and 26L. It should be appreciated that the fluid flows may communicate in any direction through the shaft assembly 10 and the fluid transfer insert 50 without departing from the scope of the present invention.

The description of the invention is merely exemplary in nature and variations that do not depart from the gist of the invention are intended to be within the scope of the invention. Such variations are not to be regarded as a departure from the spirit and scope of the invention.

What is claimed is:

1. A shaft assembly comprising:
a shaft having an inner surface that defines a bore, the bore defining an axis, wherein the shaft has a first fluid port that communicates a fluid to the bore and a second fluid port that communicates the fluid from the bore, wherein the first fluid port is located a distance along the axis from the second fluid port; and
a fluid transfer insert located within the bore and coaxial with the axis, the fluid transfer insert having an outer surface sealingly engaged with the inner surface of the shaft, the outer surface having a first end wall, a second end wall, and a pair of side walls that extend into the fluid transfer insert to define a fluid channel having a length at least greater than the distance between the first fluid port and the second fluid port, the fluid channel parallel to the axis and in communication with the first fluid port and the second fluid port; and
wherein the fluid communicates from the first fluid port through the fluid channel to the second fluid port.

2. The shaft assembly of claim 1 wherein the fluid channel has a bottom surface defined by the outer surface of the fluid transfer insert and a top surface defined by the inner surface of the shaft.

3. The shaft assembly of claim 2 wherein each of the pair of side walls are at a right angle with respect to the bottom surface.

4. The shaft assembly of claim 1 wherein the shaft includes at least eight fluid ports and wherein the fluid transfer insert includes four fluid channels, and wherein each of the fluid channels is in fluid communication with at least two of the plurality of fluid ports such that fluid communicates from four of the eight fluid ports through the four fluid channels to another four of the eight fluid ports.

5. The shaft assembly of claim 4 wherein a first and second of the four fluid channels have a length greater than a length of a third and fourth of the four fluid channels.

6. The shaft assembly of claim 5 wherein the four fluid channels are spaced equally circumferentially apart on the outer surface of the fluid transfer insert.

7. The shaft assembly of claim 1 wherein the fluid transfer insert includes a radial flange that abuts a stepped portion located in the bore of the shaft.

8. The shaft assembly of claim 7 wherein the fluid transfer insert includes a protuberance that engages an aperture located in the bore of the shaft in order to prevent the fluid transfer insert from rotating relative to the shaft.

9. The shaft assembly of claim 1 further comprising a snap ring that engages the inner surface of the bore and is positioned near an end of the fluid transfer insert in order to secure the fluid transfer insert in the bore.

10. The shaft assembly of claim 1 wherein the shaft includes a third fluid port for communicating a fluid to the bore and a fourth fluid port for receiving the fluid from the bore, wherein the fluid transfer insert includes an inner surface that defines a central passage coaxial with the axis of the bore, an opening in an end of the fluid transfer insert that communicates with the central passage, and a fluid port located on the outer surface of the fluid transfer insert that communicates with the central passage, and wherein the fluid communicates from the third fluid port, through the bore, through the opening in the fluid transfer insert, through the central passage, through the fluid port in the fluid transfer insert, and to the fourth fluid port in the shaft.

11. A fluid transfer insert for communicating fluid between a plurality of fluid ports in a shaft assembly, the fluid transfer insert comprising:
a cylindrical outer surface sealingly engaged with the shaft assembly, the outer surface having a plurality of fluid channels each defined by a bottom surface, a pair of end walls that extend into the fluid transfer insert, and a pair of side walls that extend into the fluid transfer insert, wherein each of the fluid channels is in fluid communication with at least a pair of fluid ports in the shaft assembly;
an inner surface that defines a central passage coaxial with the shaft and defines a fluid port that communicates with the central passage and with a fluid port in the shaft assembly;
a first end that defines an opening that communicates with the central passage and at least one of the fluid ports in the shaft assembly;
a second end that includes a radial flange for abutting the shaft assembly; and
a protuberance that extends out from the radial flange for engaging the shaft assembly in order to prevent the fluid transfer insert from rotating relative to the shaft assembly; and
wherein fluid flow communicates from one of the fluid ports in the shaft assembly, through one of the fluid channels and central passage, to another of the fluid ports in the shaft assembly.

12. The fluid transfer insert of claim 11 wherein each of the pair of side walls are at a right angle with respect to the bottom surfaces.

13. The fluid transfer insert of claim 12 wherein the fluid channels are spaced equally circumferentially apart on the outer surface of the fluid transfer insert.

14. The fluid transfer insert of claim 13 wherein a first and second of the fluid channels have a length greater than a length of a third and fourth of the fluid channels.

15. The fluid transfer insert of claim 13 wherein a length of each of the fluid channels is at least equal to a distance between the pair of ports that communicate with each of the fluid channels.

* * * * *